United States Patent
Shimizu et al.

(10) Patent No.: US 10,466,658 B2
(45) Date of Patent: Nov. 5, 2019

(54) NUMERICAL CONTROLLER AND MACHINE LEARNING DEVICE

(71) Applicant: FANUC CORPORATION, Minamitsuru-gun, Yamanashi (JP)

(72) Inventors: Kenji Shimizu, Yamanashi (JP); Kazuo Satou, Yamanashi (JP); Hideaki Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 37 days.

(21) Appl. No.: 15/869,852

(22) Filed: Jan. 12, 2018

(65) Prior Publication Data

US 2018/0210406 A1 Jul. 26, 2018

(30) Foreign Application Priority Data

Jan. 24, 2017 (JP) .................................. 2017-010598

(51) Int. Cl.
*G05B 13/02* (2006.01)
*G05B 19/414* (2006.01)

(52) U.S. Cl.
CPC ....... *G05B 13/0265* (2013.01); *G05B 13/027* (2013.01); *G05B 19/414* (2013.01); *G05B 2219/33038* (2013.01); *G05B 2219/33044* (2013.01)

(58) Field of Classification Search
None
See application file for complete search history.

(56) References Cited

U.S. PATENT DOCUMENTS

| 5,019,763 A | * | 5/1991 | Komatsu | G05B 19/184 318/39 |
| 5,357,439 A | * | 10/1994 | Matsuzaki | G05B 19/41865 700/96 |
| 10,082,771 B2 | * | 9/2018 | Nakazawa | H02P 29/40 |
| 2006/0161391 A1 | * | 7/2006 | Inaba | G06F 11/2257 702/183 |
| 2006/0255759 A1 | * | 11/2006 | Takeuchi | G05B 19/404 318/574 |

(Continued)

FOREIGN PATENT DOCUMENTS

| JP | H03259303 A | 11/1991 |
| JP | H06274228 A | 9/1994 |

(Continued)

OTHER PUBLICATIONS

Notification of Reasons for Refusal for Japanese Application No. 2017-010598, dated Jun. 26, 2018, with translation, 5 pages.

(Continued)

*Primary Examiner* — Jason Lin
(74) *Attorney, Agent, or Firm* — RatnerPrestia

(57) ABSTRACT

A numerical controller has a machine learning device that performs machine learning of the adjustment of a setting value used in override control. The machine learning device acquires state data showing states of the numerical controller and a machine, sets reward conditions, calculates a reward based on the state data and the reward conditions, performs the machine learning of the adjustment of the setting value used in override control, and determines the adjustment of the setting value used in override control, based on a machine learning result and the state data.

4 Claims, 7 Drawing Sheets

(56) References Cited

U.S. PATENT DOCUMENTS

| | | | |
|---|---|---|---|
| 2011/0063122 A1* | 3/2011 | Matsubara | G05B 19/406 340/679 |
| 2014/0350819 A1* | 11/2014 | Johansson | B60K 31/00 701/93 |
| 2015/0168938 A1* | 6/2015 | Fujimoto | G05B 19/4163 700/160 |
| 2016/0291573 A1* | 10/2016 | Kameta | G05B 19/402 |
| 2017/0032283 A1 | 2/2017 | Kamiya | |
| 2017/0091667 A1* | 3/2017 | Yukawa | G06N 20/00 |
| 2017/0091672 A1* | 3/2017 | Sasaki | H02P 29/40 |
| 2017/0220008 A1* | 8/2017 | Takahashi | G05B 13/0265 |
| 2018/0164756 A1 | 6/2018 | Yamaguchi | |

FOREIGN PATENT DOCUMENTS

| | | |
|---|---|---|
| JP | H 07-036506 A | 2/1995 |
| JP | 2012-032869 A | 2/2012 |
| JP | 5969676 B1 | 8/2016 |
| JP | 5997330 B1 | 9/2016 |
| JP | 2018097680 A | 6/2018 |
| WO | WO 2007/049412 A1 | 5/2007 |

OTHER PUBLICATIONS

Decision to Grant a Patent for Japanese Application No. 2017-010598, dated Nov. 27, 2018, with translation, 6 pages.

\* cited by examiner

NUMERICAL CONTROLLER AND MACHINE LEARNING DEVICE

CROSS-REFERENCE TO RELATED APPLICATIONS

This application is a new U.S. Patent Application that claims benefit of Japanese Patent Application No. 2017-010598, filed Jan. 24, 2017, the disclosure of this application is being incorporated herein by reference in its entirety for all purposes.

BACKGROUND OF THE INVENTION

1. Field of the Invention

The present invention relates to a numerical controller and a machine learning device and, in particular, to a numerical controller and a machine learning device that perform machine learning to learn an optimum override control setting value.

2. Description of the Related Art

As a related art where machining is performed by a working machine, the function of controlling a feed rate override with proportional-integral-differential (PID) control using a load on a spindle as an input value has been known (see, for example, Japanese Patent Application Laid-open No. 2012-032869). By the use of the function, the override is increased to shorten cycle time at a part having a small load and decreased to prevent breakage of a tool or an overheat at a part having a large load.

In a method for controlling a feed rate, the PID control has been widely used as general control to maintain a target value at a constant value. An output based on the PID control may be generally calculated according to the following Formula (1). Note that in Formula (1), time at which the PID control starts is indicated as $t_0$.

$$O(t) = K_p e_L(t) + \int_{t_0}^{t} K_i e_L(t) dt + K_d \frac{d}{dt} e_L(t) + C \quad (1)$$

O(t): Output value
$e_L$(t): Difference between goal of an object to be controlled and current value (time t)
$K_p$: Gain of proportional term in PID control
$K_i$: Gain of integral term in PID control
$K_d$: Gain of differential term in PID control
C: Offset in PID control FIG. 8 shows an example of a block diagram of feedback control using the PID control according to a related art.

When a feed rate is controlled to make a load on a spindle constant, an output value O(t) is set as a feed rate (override), $e_L$(t) is set as a difference between a target load on the spindle and a load on the spindle at time t, and a constant is set at an appropriate value. In this way, the load on the spindle may be made close to a target. In a state in which cutting is not performed, i.e., during the idle running of the spindle, the load on the spindle does not fluctuate even if the feed rate is increased. Therefore, control is desirably performed during the cutting, i.e., only when the load on the spindle reaches a constant value or more.

In the PID control, each gain ($K_p$, $K_i$, and $K_d$ in Formula (1) and FIG. 8) is adjusted according to a state of an object to be controlled (such as a machine configuration, a tool type, a workpiece material, and a cutting amount in a working machine) to allow appropriate feedback control corresponding to the state.

The PID control is general feedback control. Therefore, a multiplicity of experimental gain setting methods such as an ultimate sensitivity method has been devised. In addition, Japanese Patent Application Laid-open No. 7-036506 and International Publication WO 2007/049412 disclose a technology using a neural network to compensate for the action of the PID control.

However, in a method based on the PID control according to the related art, it is necessary to set gain to a state of an object to be controlled (such as a machine configuration, a tool type, a workpiece material, and a cutting amount) in machining and make an attempt many times to realize secured control.

SUMMARY OF THE INVENTION

In view of the above problems, it is an object of the present invention to provide a numerical controller and a machine learning device that perform machine learning to learn an optimum override control setting value.

A numerical controller according to an embodiment of the present invention controls a machine including at least one axis. The numerical controller includes a machine learning device that performs machine learning of an adjustment of a setting value used in override control of a motor that drives the axis. The machine learning device has: a state observation section that acquires state data indicating states of the numerical controller and the machine and containing a current value of the setting value used in override control of the motor; a reward conditions setting section that sets reward conditions; a reward calculation section that calculates a reward, based on the state data acquired by the state observation section and the reward conditions; an override control setting value adjustment learning section that performs the machine learning of the adjustment of the setting value used in override control; and an override control setting value adjustment amount determination section that determines and outputs the adjustment of the setting value used in override control, based on the state data and a machine learning result of the adjustment of the setting value used in override control by the override control setting value adjustment learning section. Further, the override control setting value adjustment learning section performs the machine learning of the adjustment of the setting value used in override control, based on the adjusted setting value, the state data acquired after the adjustment of the setting value, and the reward calculated by the reward calculation section.

The reward calculation section may calculate the reward, based on at least any of cycle time of an action of the machine, a load on a spindle of the machine, breakage of a tool attached to the machine, and machining accuracy of a workpiece machined by the machine.

The numerical controller may be connected to at least another numerical controller and mutually exchange or share the machine learning result with this other numerical controller.

A machine learning device according to another embodiment of the present invention performs machine learning of an adjustment of a setting value used in override control of a motor that drives at least one axis provided in a machine controlled by a numerical controller. The machine learning device includes: a learning result storage section that stores a machine learning result of the adjustment of the setting value used in override control; a state observation section that acquires state data indicating states of the numerical controller and the machine and containing a current value of a setting value used in override control of the motor; a reward conditions setting section that sets reward conditions; a reward calculation section that calculates a reward, based on the state data acquired by the state observation section and the reward conditions; an override control setting value adjustment learning section that performs the machine learning of the adjustment of the setting value used in override control; and an override control setting value adjustment amount determination section that determines and outputs the adjustment of the setting value used in override control, based on the state data and a machine learning result of the adjustment of the setting value used in override control by the override control setting value adjustment learning section. Further, the override control setting value adjustment learning section performs the machine learning of the adjustment of setting value used in the override control, based on the adjusted setting value, the state data acquired after the adjustment of the setting value, and the reward calculated by the reward calculation section.

According to an embodiment of the present invention, it is possible to automatically set an optimum override control setting value based on a state of a machine to be controlled (such as a machine configuration, a tool type, a workpiece material, a cutting amount, and a commanded feed rate). Thus, since an operator has no need to adjust gain according to a state of a machine, time and effort for adjusting the gain may be eliminated.

DETAILED DESCRIPTION OF THE PREFERRED EMBODIMENTS

Figure 1:
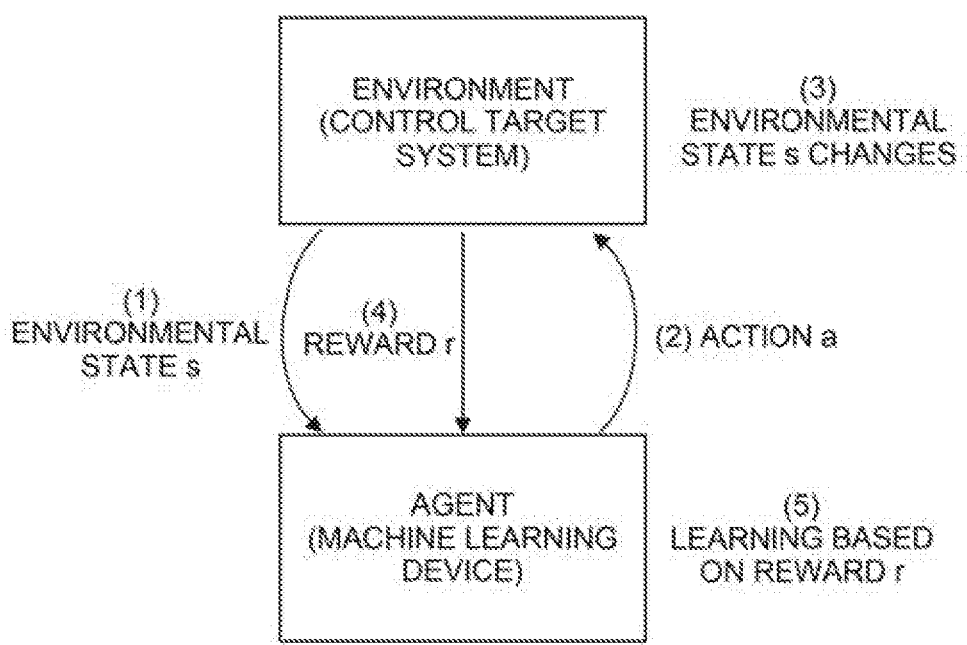
FIG. 1 is a diagram for describing the basic concept of a reinforcement learning algorithm.

In the present invention, a machine learning device acting as artificial intelligence is introduced into a numerical controller that controls a machine to perform the machine learning of the adjustment of an override control setting value (each gain of PID control) corresponding to a state of a machine (such as a machine configuration, a tool type, a workpiece material, a cutting amount, and a commanded feed rate). Thus, the PID control may be appropriately performed with respect to the state of the machine.

Hereinafter, a description will be briefly given of machine learning to be introduced into the present invention.

(1) Machine Learning

Here, machine learning will be briefly described. The machine learning is realized in such a way that useful rules, knowledge expressions, determination criteria, or the like are extracted by analysis from sets of data input to a device that performs the machine learning (hereinafter called a machine learning device), determination results of the extraction are output, and learning of knowledge is performed. Although machine learning is performed according to various methods, the methods are roughly classified into "supervised learning," "unsupervised learning," and "reinforcement learning." In addition, in order to realize such methods, there is a method called "deep learning" by which to learn the extraction of feature amounts per se.

The "supervised learning" is a model by which sets of input and result (label) data are given to a machine learning device in large amounts to learn the features of the data sets and estimate results from inputs, i.e., a method by which the relationship between inputs and results may be inductively obtained. The method may be realized using an algorithm such as a neural network that will be described later.

The "unsupervised learning" is a learning method by which a device that learns, with the reception of only large amounts of input data, as to how the input data is distributed and applies compression, classification, shaping, or the like to the input data even if corresponding supervised output data is not given. The features of the data sets can be arranged in clusters each having similar characteristic in common. Using the results, any standard is set to allocate outputs so as to be optimized. Thus, the prediction of the outputs may be realized. In addition, as an intermediate problem setting between the "unsupervised learning" and the "supervised learning", there is a method called "semi-supervised learning" in which some parts are exclusively given sets of input and output data while the other parts are given only input data.

In an embodiment, since data that may be acquired even if a machining machine does not actually operate is used in the unsupervised learning, efficient learning is allowed.

The "reinforcement learning" is a method by which to learn not only determinations or classifications but also actions to perform learning of optimum actions in consideration of interactions given to environments by actions, i.e., learning to maximize rewards that will be obtained in the future. In the reinforcement learning, a machine learning device may start learning in a state in which the machine learning device does not completely know or imperfectly knows results brought about by actions. In addition, a machine learning device may start learning from a desirable start point in an initial state in which prior learning (a method such as the above supervised learning and inverse reinforcement learning) is performed in such as way as to imitate human's actions.

Note that when machine learning is applied to a numeral controller which controls a machine tool, it is necessary to consider the fact that results may be obtained as data only after the machine tool actually operates, i.e., searching of optimum actions is performed by a trial and error approach. In view of the above circumstances, the present invention employs, as the principal learning algorithm of a machine learning device, the algorithm of reinforcement learning by which the machine learning device is given rewards to automatically learn actions to achieve a goal.

FIG. 1 is a diagram for describing the basic concept of a reinforcement learning algorithm.

In reinforcement learning, by an interactions between an agent (machine learning device) acting as a learning subject and an environment (control target system) acting as a control target, learning and action of the agent are advanced. More specifically, the following interactions are performed between the agent and the environment.

(1) The agent observes an environmental condition $s_t$ at a certain time.

(2) Based on an observation result and past learning, the agent selects and performs an action $a_t$ that the agent is allowed to take.

(3) The environmental condition $s_t$ changes to a next state $s_{t+1}$ based on any rule and performance of the action $a_t$.

(4) The agent accepts a reward $r_{t+1}$ based on the state change as a result of the action $a_t$.

(5) The agent advances the learning based on the state $s_t$, the action $a_t$, the reward $r_{t+1}$, and a past learning result.

At the initial stage of the reinforcement learning, the agent does not understand the standard of a value judgment for selecting the optimum action $a_t$ with respect to the environmental condition $s_t$ in the above action selection (2) Therefore, the agent selects various actions $a_t$ in a certain state $s_t$ and learns the selection of a better action, i.e., the standard of an appropriate value judgment based on rewards $r_{t+1}$ given with respect to the actions $a_t$ at that time.

In the above learning (5), the agent acquires the mapping of an observed state $s_t$, an action $a_t$, and a reward $r_{t+1}$ as reference information for determining an amount of a reward that the agent is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a state or an action selected based on the above acquired mapping is valuable, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state that transitions according to the action, or the like in learning in which actions are repeated. The update formula of the state value function is defined according to a reinforcement learning algorithm. For example, in temporal-difference (TD) learning indicating as one of reinforcement learning algorithms, the state value function is updated by the following formula (2). Note that in the following formula (2), α is called a learning coefficient, γ is called a discount rate, and the learning coefficient and the discount rate are defined to fall within 0<α≤1 and 0<γ≤1, respectively.

$$V(s_t) \leftarrow V(s_t) + \alpha[r_{t+1} + \gamma V(s_{t+1}) - V(s_t)] \quad (2)$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state that transitions according to the action, or the like in learning in which actions are repeated. The update formula of the action value function is defined according to a reinforcement learning algorithm. For example, in Q-learning indicating as one of typical reinforcement learning algorithms, the action value function is updated by the following formula (3). Note that in the following formula (3), α is called a learning coefficient, γ is called a discount rate, and the learning coefficient and the discount rate are defined to fall within 0<α≤1 and 0<γ≤1, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad (3)$$

The above formula expresses a method for updating an evaluation value $Q(s_t, a_t)$ of an action $a_t$ in a state $s_t$ based on a reward $r_{t+1}$ returned as a result of the action $a_t$. It is indicated by the formula that $Q(s_t, a_t)$ is increased if an evaluation value $Q(s_{t+1}, \max(a))$ of the best action max(a) in a next state as a result of the reward $r_{t+1}$ and the action $a_t$ is greater than the evaluation value $Q(s_t, a_t)$ of the action $a_t$ in the state $s_t$, while $Q(s_t, a_t)$ is decreased if not. That is, a value of a certain action in a certain state is made closer to a value of a reward immediately returned as a result of the action and the best action in a next state accompanied by the action.

In Q-learning, such an update is repeatedly performed to finally set $Q(s_t, a_t)$ at an expected value $E(\Sigma\gamma^t r_t)$ (the expected value is one taken when a state is changed according to an optimum action. Since the expected value is unknown as a matter of course, it is necessary to learn the expected value by search).

Further, in the above action selection (2), an action $a_t$ by which a reward ($r_{t+1}+r_{t+2}+\ldots$) over a future becomes maximum in a current state $s_t$ (an action for changing to a most valuable state in case where a state value function is used, or a most valuable action in the state in case where an action value function is used) is selected using a value function (evaluation function) generated by past learning. Note that during learning, an agent may select a random action with a constant probability for the purpose of advancing the learning in the selection of an action in the above action selection (2) (ε greedy method).

Note that in order to store a value function (evaluation function) as a learning result, there are a method for retaining values of all the pairs (s, a) of states and actions in a table form (action value table) and a method for preparing a function for approximating the above value function. According to the latter method, the above update formula may be realized by adjusting parameters of an approximate function based on a method such as method for probabilistic gradient descent. For the approximate function, a supervised learning device such as a neural network may be used.

Figure 2:
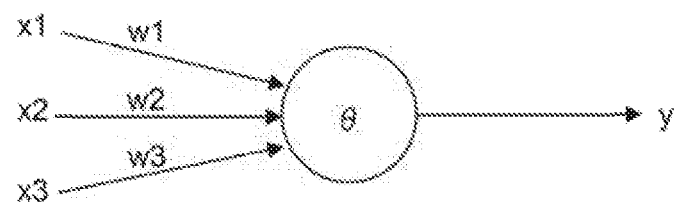
FIG. 2 is a schematic diagram showing a neuron model.

The neural network is constituted by a calculation unit, a memory, and the like that realize a neural network following a neuron model as shown in, for example, FIG. 2. FIG. 2 is a schematic diagram showing a neuron model.

As shown in FIG. 2, a neuron outputs an output y with respect to a plurality of inputs x (here, inputs $x_1$ to $x_3$ as an example). A corresponding weight w ($w_1$ to $w_3$) is placed on each of the inputs $x_1$ to $x_3$. Thus, the neuron outputs the output y expressed by the following formula (4). Note that in the following formula (4), an input x, an output y, and a weight w are all vectors. In addition, θ indicates a bias, and $f_k$ indicates an activation function.

$$y = f_k(\Sigma_{i=1}^n x_i w_i - \theta) \quad (4)$$

Next, a description will be given, with reference to FIG. 3, of a neural network having weights of three layers in which the above neurons are combined together.

Figure 3:
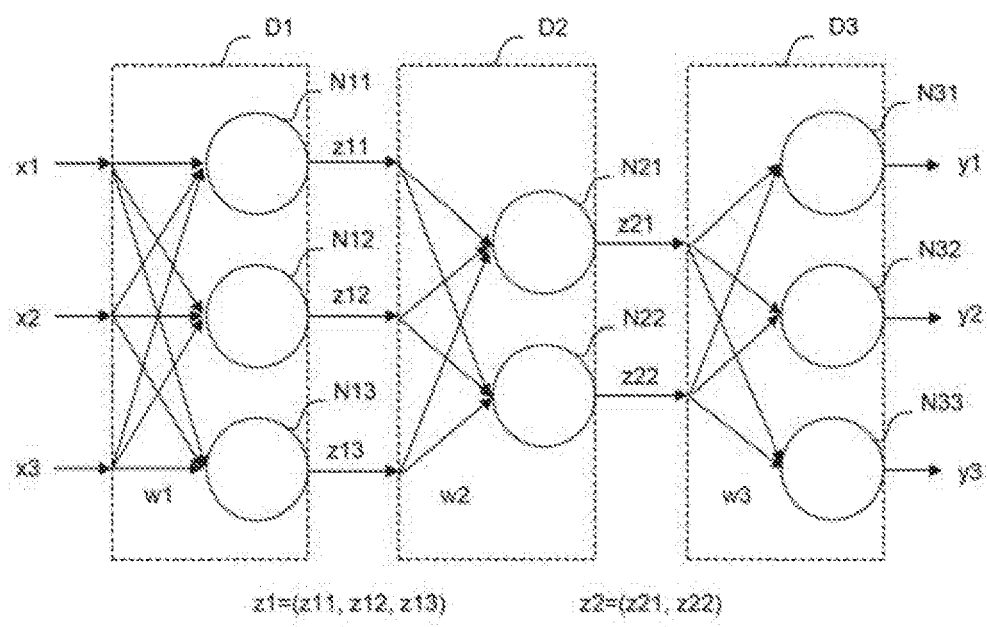
FIG. 3 is a schematic diagram showing a neural network having weights of three layers.

FIG. 3 is a schematic diagram showing a neural network having weights of three layers D1 to D3. As shown in FIG. 3, a plurality of inputs x (here, inputs x1 to x3 as an example) is input from the left side of the neural network, and results y (here, results y1 to y3 as an example) are output from the right side of the neural network.

Specifically, when inputs x1 to x3 are input to three neurons N1 to N13, corresponding weights are placed on the inputs x1 to x3. The weights placed on the inputs are collectively indicated as w1. The neurons N1 to N13 output z11 to z13, respectively. Z11 to Z13 are collectively indicated as a feature vector z1, and may be regarded as vectors obtained by extracting feature amounts of the input vectors. The feature vector z1 is a feature vector between the weight w1 and a weight w2.

When z11 to z13 are input to two neurons N21 and N22, corresponding weights are placed on these z11 to z13. The weights placed on the feature vectors are collectively indicated as w2. The neurons N21 and N22 output z21 and z22, respectively. z21 and z22 are collectively indicated as a feature vector z2. The feature vector z2 is a feature vector between the weight w2 and a weight w3.

When the feature vectors z21 and z22 are input to three neurons N31 to N33, corresponding weights are placed on these feature vectors z21 and z22. The weights placed on the feature vectors are collectively indicated as w3.

Finally, the neurons N31 to N33 output the results y1 to y3, respectively.

The operation of the neural network includes a learning mode and a value prediction mode. A learning data set is used to learn the weight w in the learning mode, and the parameters are used to determine the action of a machining machine in the prediction mode (here, "prediction" is only for the sake of convenience, but various tasks such as detection, classification, and deduction may be included).

It is possible to immediately learn data obtained by controlling a machine tool by a controller in the prediction mode and reflect the learned data on a next action (online learning), or is possible to perform collective learning using a previously-collected data group and thereafter perform a detection mode using the parameters at all times (batch learning). It is also possible to perform an intermediate mode, i.e., a learning mode that is performed every time data is accumulated by a certain degree.

Learning of the weights w1 to w3 is made possible by error back propagation. Error information enters from the right side and flows to the left side. The error back propagation is a method for adjusting (learning) each of the weights to reduce a difference between the output y obtained when the input x is input and a real output y (supervised) for each of the neurons.

Figure 4:
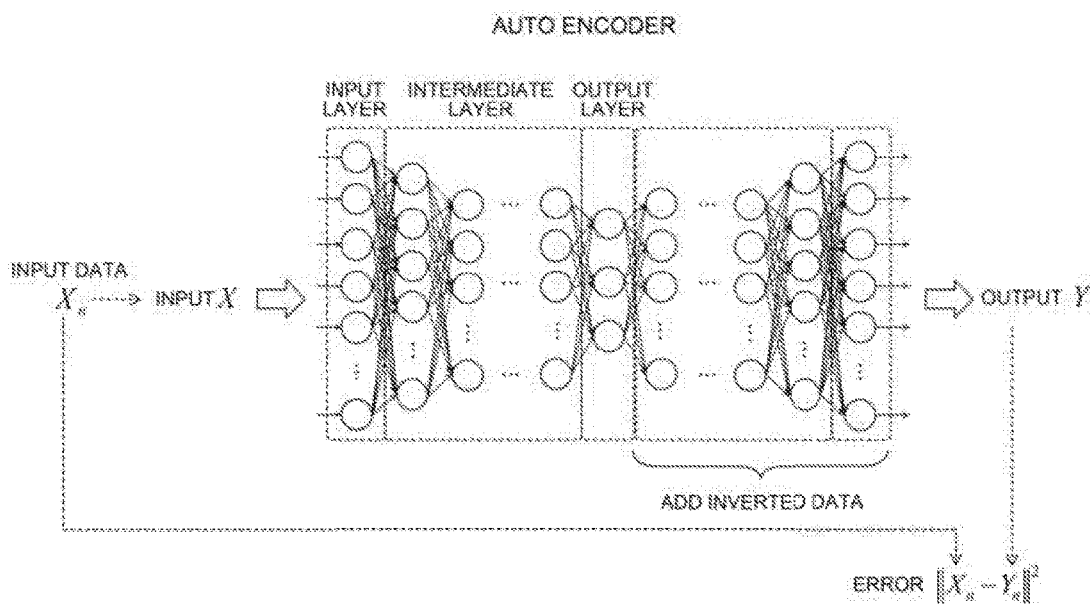
FIG. 4 is a diagram showing an example of a case in which an auto encoder is used as a learning model.

The neural network may have three or more layers (called deep learning). It is possible to automatically obtain a calculation unit that extracts the features of inputs on a step-by-step basis and performs the regression of a result only from supervised data. Further, when a multilayer neural network is used, a conventional auto encoder as shown in FIG. 4 may be constructed to extract feature amounts per se, thereby performing autonomous learning.

When such a neural network is used as an approximate function, the above value function (evaluation function) may be stored as the neural network to advance learning while the above actions (1) to (5) in the above reinforcement learning is repeatedly performed.

Generally, a machine learning device may advance learning to be adapted to a new environment by performing additional learning even when being put into the new environment after completing the learning in a certain environment. Accordingly, when the machine learning is applied to the adjustment of override control setting values (various gains for PID control), it becomes possible to perform the learning of adjustment of override control setting values in a short time by performing additional learning under new preconditions of machining, based on the past learning of adjustment of override control setting values, even in the case where the machine learning is applied to new preconditions of machine control.

In addition, reinforcement learning employs a system in which a plurality of agents is connected to each other via a network or the like, and information on states s, actions a, rewards r, or the like is shared between the agents and applied to each learning, whereby each of the agents performs dispersed reinforcement learning in consideration of the environments of the other agents to be able to perform efficient learning.

In the embodiment of the present invention as well, a plurality of agents (machine learning devices) incorporated in a plurality of environments (numerical controllers that control machines) perform dispersed machine learning in a state of being connected to each other via a network or the like, whereby the numerical controllers are allowed to efficiently perform the learning of the adjustment of override control setting values.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the numerical controller according to the present invention into which a machine learning device is introduced.

(2) Embodiment

Figure 5:
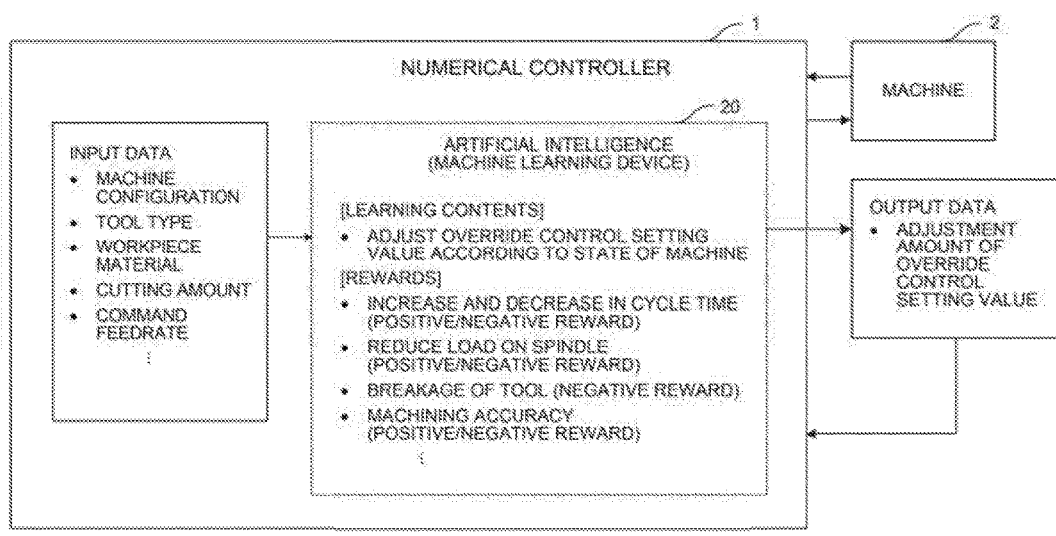
FIG. 5 is a diagram showing an image on the machine learning of a numerical controller according to an embodiment of the present invention.

FIG. 5 is a diagram showing an image on the machine learning of the adjustment of an override control setting value in a numerical controller into which a machine learning device according to an embodiment of the present invention is introduced. Note that in FIG. 5, only configurations necessary for describing the machine learning of the numerical controller in the embodiment will be shown.

In the embodiment, information which the machine learning device 20 uses to specify an environment (the state $s_t$ described in "(1) Machine Learning") which includes information on a machine configuration, a tool type, a workpiece material, and a cutting amount, which are acquired from a machine 2, and a commanded feed rate and a current value of an override control setting value (such as each gain of PID control) according to a program, is input to a machine learning device 20 as state information.

In the embodiment, the machine learning device 20 outputs an adjustment amount of an override control setting value for the PID control of the machine 2 as an output to an environment (the action $a_t$ described in "(1) Machine Learning").

In a numerical controller 1 according to the embodiment, the above state information is defined by a state such as a machine configuration, a tool type, a workpiece material, a cutting amount which are acquired from a machine 2, and a commanded feed rate and an override control setting value (such as each gain of PID control) according to a program.

Further, the above adjustment action may be defined by an adjustment amount of an override control setting value for the PID control of the machine 2 output from the machine learning device 20.

In addition, in the embodiment, an increase and decrease in cycle time (positive/negative reward), a reduction in load on a spindle (positive/negative reward), breakage of a tool (negative reward), machining accuracy (positive/negative reward), or the like is employed as a reward (the reward $r_t$ described in "(1) Machine Learning") to be given to the machine learning device 20. Note that an operator may appropriately set as to which data is used to determine a reward.

Moreover, in the embodiment, the machine learning device 20 performs machine learning based on state information (input data), an adjustment action (output data), and a reward described above. In the machine learning, a state $s_t$ is defined by the combination of input data at certain time t, the adjustment of an override control setting value performed with respect to the defined state $s_t$ is equivalent to an action $a_t$, and a value evaluated and calculated on the basis of data on a machine operating result that is newly obtained by carrying out an adjustment of an override control setting value with the action $a_t$ is equivalent to a reward $r_{t+1}$. As in "(1) Machine Learning" described above, a state $s_t$, an action $a_t$, and a reward $r_{t+1}$ are applied to the update formula of a value function (evaluation function) corresponding to a machine learning algorithm to advance the learning.

Hereinafter, a description will be given of a function block diagram of a numerical controller.

Figure 6:
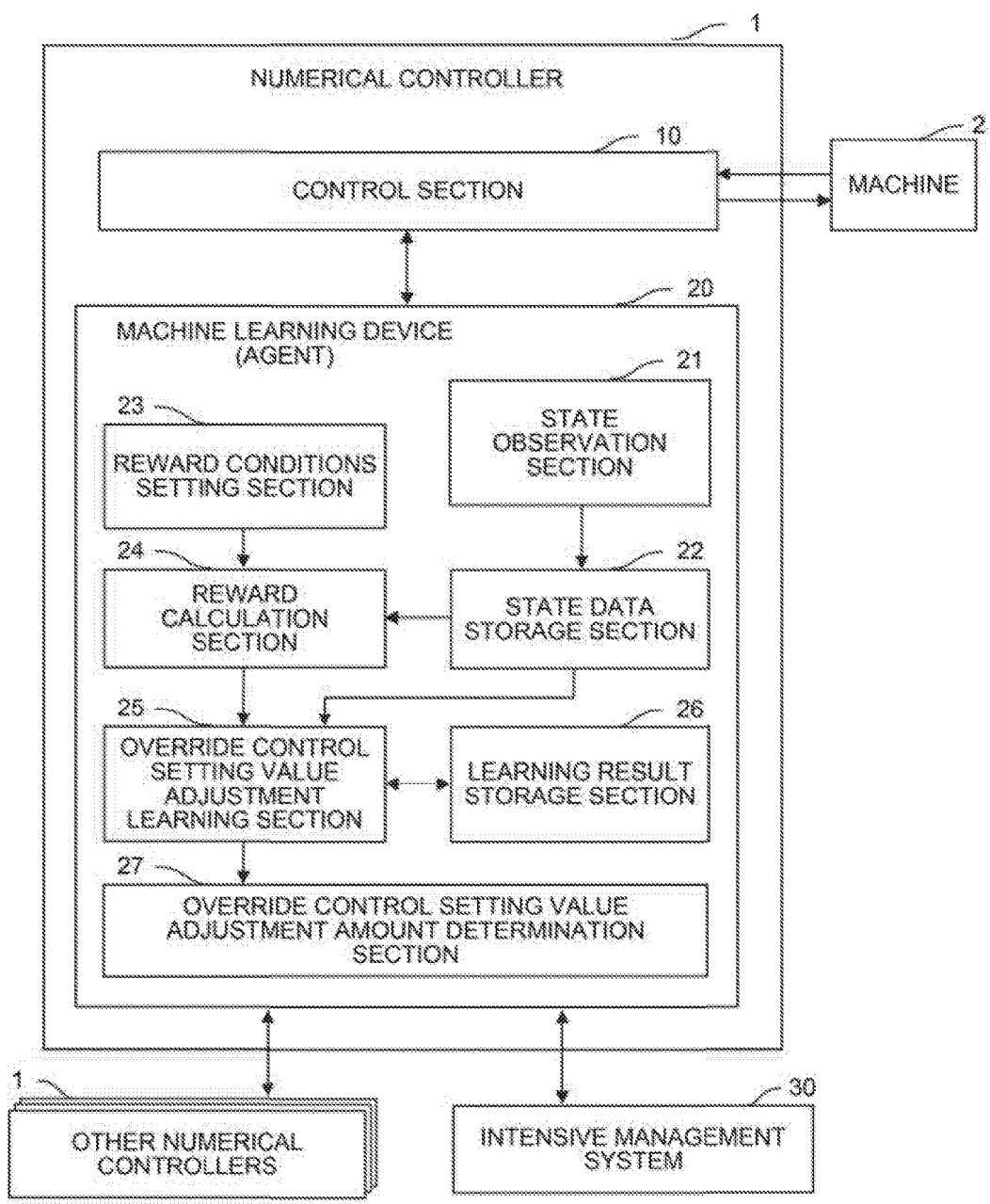
FIG. 6 is a schematic function block diagram of the numerical controller according to the embodiment of the present invention.

FIG. 6 is a function block diagram of the numerical controller according to the embodiment.

The numerical controller 1 of the embodiment has a configuration normally provided therein such as a servo control section (not shown) that controls a servo motor (not shown) to drive axes provided in the machine 2 to be controlled, a control section 10 that controls the servo control section, peripheral equipment, or the like, and a machine learning device 20 that acts as artificial intelligence to perform machine learning. When configurations shown in FIG. 6 are compared with the elements in the reinforcement learning shown in FIG. 1, the machine learning device 20 corresponds to the agent and configurations such as the machine 2 other than the machine learning device 20 correspond to the environment. Note that the numerical controller 1 is assumed to have the configurations of a general numerical controller other than those described above, and that a detailed description of configurations other than those especially necessary for describing the operation of the machine learning in the present invention will be omitted herein.

The control section 10 analyzes a program read from a memory (not shown) or input via input equipment (not shown) or the like, and controls each section of the machine 2 based on control data obtained as an analysis result. The control section 10 generally performs control based on an analysis result of a program. However, in the embodiment, the control section 10 controls each axis of the machine 2 according to an override control setting value adjusted by an output from the machine learning device 20.

The machine learning device 20 that performs machine learning has a state observation section 21, a state data storage section 22, a reward conditions setting section 23, a reward calculation section 24, an override control setting value adjustment learning section 25, a learning result storage section 26, and an override control setting value adjustment amount determination section 27. The machine learning device 20 may be provided inside the numerical controller 1 as shown in FIG. 6, or may be provided in a personal computer or the like outside the numerical controller 1.

The state observation section 21 observes states of the numerical controller 1 and the machine 2 via the control section 10 and acquires observation results inside the machine learning device 20 as state data. The acquired state data includes a machine configuration, a tool type, a workpiece material, and a cutting amount, which are acquired from the machine 2, and a commanded feed rate and a current value of an override control setting value (such as each gain of PID control) according to a program, and a calculation value calculated by performing the arithmetical operation of each physical amount. When acquiring the states of the numerical controller 1 and the machine 2 as state data, the state observation section 21 may digitize data other than numerical values such as characters and symbols according to a prescribed rule set in advance.

The state data storage section 22 receives and stores state data and outputs the stored state data to the reward calculation section 24 and the override control setting value adjustment learning section 25. The state data input to the state data storage section 22 may be data acquired by the latest machining operation or data acquired by the past machining operation. In addition, it is also possible for the state data storage section 22 to receive and store state data stored in other numerical controllers 1 or an intensive management system 30, or is possible for the state data storage section 22 to output state data stored in the state data storage section 22 to other numerical controllers 1 or the intensive management system 30.

The reward conditions setting section 23 sets conditions for giving rewards in machine learning set by an operator or the like. Positive and negative rewards are given and may be appropriately set. In addition, an input to the reward conditions setting section 23 may be performed via a personal computer, a tablet terminal, or the like for an intensive management system. However, with an input via a manual data input (MDI) device (not shown) provided in the numerical controller 1, it becomes possible to more easily set conditions for giving rewards.

The reward calculation section 24 analyzes state data input from the state observation section 21 or the state data storage section 22 based on conditions set by the reward conditions setting section 23, and outputs calculated rewards to the override control setting value adjustment learning section 25.

Hereinafter, a description will be given of an example of reward conditions set by the reward conditions setting section 23 in the embodiment. Note that the following reward conditions are given only as examples and may be changed in terms of design. Alternatively, various other reward conditions may be set.

Reward 1: Increase and Decrease in Cycle Time (Positive/Negative Reward)

When cycle time in a series of operations (machining operations) of the machine 2 is shorter than a prescribed reference value set in advance, a positive reward is given according to the degree. On the other hand, when the cycle time in the series of operations (machining operations) of the machine 2 is longer than the prescribed reference value set in advance, a negative reward is given according to the degree.

Reward 2: Reduction in Load on Spindle (Positive/Negative Reward)

When a load on a spindle in the operations (machining operations) of the machine 2 is smaller than a prescribed reference value set in advance, a positive reward is given according to the degree.

When the load on the spindle in the operations (machining operations) of the machine 2 is larger than the prescribed reference value set in advance, a negative reward is given according to the degree.

Reward 3: Breakage of Tool (Negative Reward)

When a tool attached to the machine 2 is broken, a large negative reward is given.

Reward 4: Machining Accuracy (Positive/Negative Reward)

When the machining accuracy of a workpiece machined by the operations (machining operations) of the machine 2 is higher than a prescribed reference value set in advance (for example, when a dimension error between a workpiece drawing designed by a CAD or the like and a machined workpiece is smaller than the prescribed reference value set in advance), a positive reward is given according to the degree.

On the other hand, when the machining accuracy of the workpiece machined by the operations (machining operations) of the machine 2 is lower than the prescribed reference value (for example, when the dimension error between the workpiece drawing designed by a CAD or the like and the machined workpiece is larger than the prescribed reference value set in advance), a negative reward is given according to the degree.

The override control setting value adjustment learning section 25 performs machine learning (reinforcement learning) based on state data observed by the state observation section 21, the adjustment of an override control setting value (output of an adjustment amount) performed by the override control setting value adjustment learning section 25 itself, and a reward calculated by the reward calculation section 24. In the machine learning performed by the override control setting value adjustment learning section 25, a state $s_t$ is defined by the combination of state data at certain time t, the determination of the adjustment action of an override control setting value and the output of the determined adjustment action to the numerical controller 1 by the override control setting value adjustment amount determination section 27 that will be described later according to the defined state $s_t$ to actually adjust the override control setting value are equivalent to an action $a_t$, and a value calculated by the reward calculation section 24 based on state data acquired by the state observation section 21 as a result of adjustment of override control setting value and control of the action of the machine 2 is equivalent to a reward $r_{t+1}$.

A value function for the learning is determined according to an applied learning algorithm. For example, when Q-learning is used, it is only necessary to update an action value function $Q(s_t, a_t)$ according to the above Formula (3) to advance the learning.

The learning result storage section 26 stores a result of machine learning performed by the override control setting value adjustment learning section 25. In addition, when the override control setting value adjustment learning section 25 uses a learning result again, the learning result storage section 26 outputs the stored learning result to the override control setting value adjustment learning section 25. As described above, a learning result may be stored in such a way that a value function corresponding to a machine learning algorithm to be used is stored in, for instance, a supervised learning device such as a support vector machine (SVM) and a neural network of an approximate function, an arrangement, or a multiple-value output.

Note that it is also possible for the learning result storage section 26 to receive and store a learning result stored in other numerical controllers 1 or the intensive management system 30, or is possible for the learning result storage section 26 to output a learning result stored in the learning result storage section 26 to other numerical controllers 1 or the intensive management system 30.

The override control setting value adjustment amount determination section 27 determines the adjustment action of an override control setting value based on a learning result learned by the override control setting value adjustment learning section 25 (and stored in the learning result storage section 26) and state data observed by the state observation section 21, and outputs a determination result (adjustment amount of the override control setting value) to the control section 10. The determination of the adjustment action of the override control setting value here is equivalent to an action a for machine learning. The adjustment action of the override control setting value may be performed in such a way that the selection of a gain ($K_p$, $K_I$, or $K_d$) as an adjustment target and an adjustment degree of the selected gain are combined together, respective combinations are set and prepared as selectable actions (for example, an action 1=the gain $K_p$ is set at XX, an action 2=the gain $K_I$ is set at +YY, . . . ), and an action by which the largest reward will be obtained in the future based on a past learning result is selected. The selectable actions may be actions by which a plurality of gains are adjusted at the same time. In addition, the above ε greedy method may be employed to select a random action with a prescribed probability for the purpose of advancing the learning of the override control setting value adjustment learning section 25 that will be described later.

Then, the control section 10 adjusts an override control setting value based on an adjustment amount of an override control setting value received from the override control setting value adjustment amount determination section 27.

Figure 7:
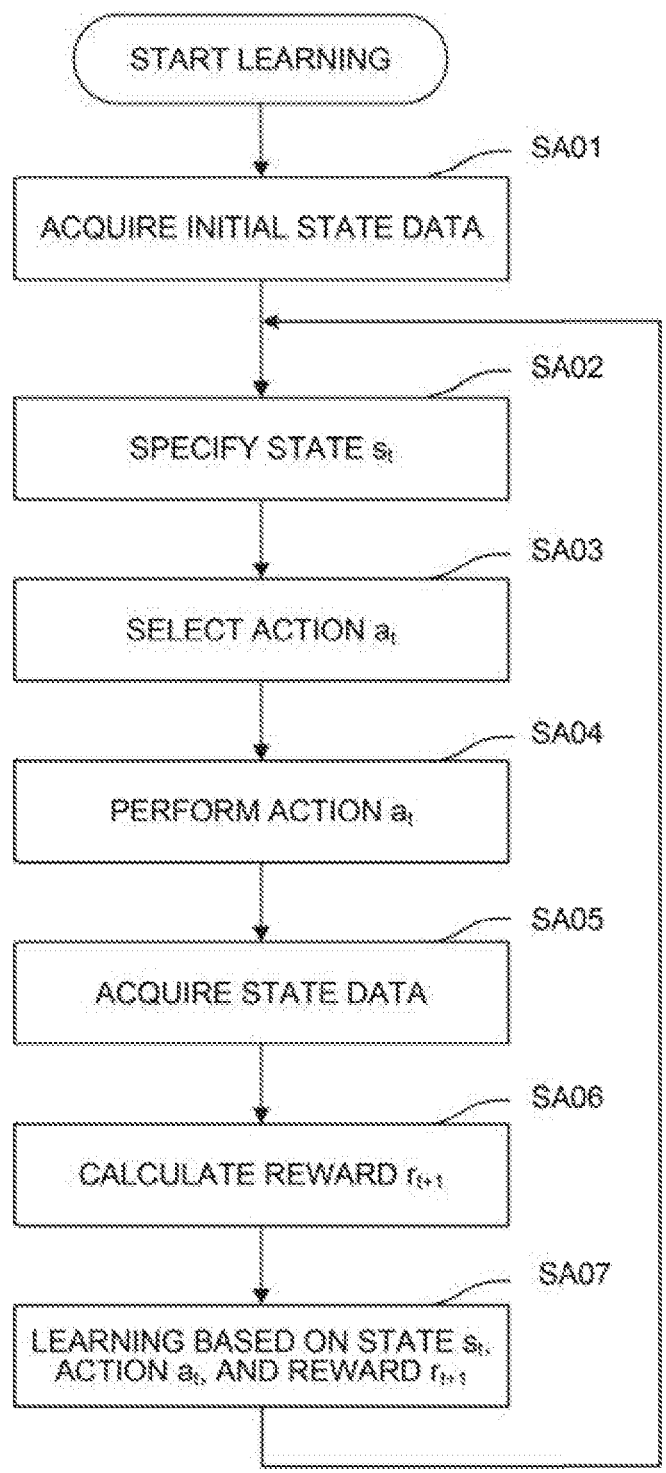
FIG. 7 is a flowchart showing the flow of the machine learning according to the embodiment of the present invention.
Figure 8:
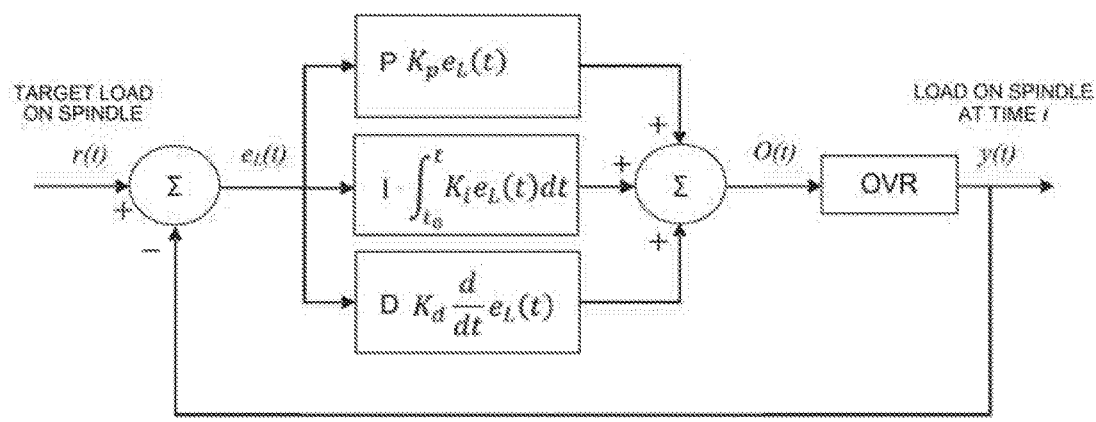
FIG. 8 is an example of a block diagram of feedback control using PID control according to a related art.

A description will be given, with reference to the flowchart of FIG. 7, of the flow of machine learning performed by the override control setting value adjustment learning section 25.

Step SA01. When the machine learning starts, the state observation section 21 observes states of the numerical controller 1 and the machine 2 as state data via the control section 10.

Step SA02. The override control setting value adjustment learning section 25 specifies a current state $s_t$ based on the state data observed by the state observation section 21.

Step SA03. The override control setting value adjustment amount determination section 27 selects an action $a_t$ (adjustment action of an override control setting value) based on a past learning result and the state $s_t$ specified in step SA02.

Step SA04. The control section 10 performs the adjustment action $a_t$ of the override control setting value selected in step SA03.

Step SA05. The state observation section 21 acquires the states of the numerical controller 1 and the machine 2 as state data. At this stage, the states of the numerical controller 1 and the machine 2 change with a temporal transition from time t to time t+1 as a result of the action $a_t$ performed in step SA04.

Step SA06. The reward calculation section 24 calculates a reward $r_{t+1}$ based on the state data acquired in step SA05.

Step SA07. The override control setting value adjustment learning section 25 advances the machine learning based on the state $s_t$ specified in step SA02, the action $a_t$ selected in step SA03, and the reward $r_{t+1}$ calculated in step SA06, and the process returns to step SA02.

As described above, an override control setting value is adjusted based on the determination of the override control setting value adjustment amount determination section 27, the machine 2 is controlled by the adjusted override control setting value to operate (machine a workpiece), state data is observed by the state observation section 21, and the machine learning is repeatedly performed. Thus, a more excellent learning result may be acquired.

When an override control setting value is actually adjusted using learning data that has been sufficiently subjected to the above machine learning, the machine learning device 20 may be operated so as not to perform new learning using the learning data that has been sufficiently subjected to the machine learning as it is.

In addition, the machine learning device 20 that has completed the machine learning (or the machine learning device 20 in which completed learning data on other machine learning devices 20 has been copied) may be attached to other numerical controllers 1 and operated using the learning data that has been sufficiently subjected to the machine learning as it is.

The machine learning device 20 of the numerical controller 1 may perform the machine learning alone. However, when a plurality of numerical controllers 1 further has a unit used to communicate with an outside, it becomes possible to send/receive and share a value function stored in each of the learning result storage sections 26. Thus, the machine learning may be more efficiently performed. For example, parallel learning is advanced between a plurality of numerical controllers 1 in such a way that state data and value functions acting as learning results are exchanged between the numerical controllers 1 while adjustment targets and adjustment amounts different between the plurality of numerical controllers 1 are fluctuated within a prescribed range. Thus, the learning may be more efficiently performed.

In order to exchange the state data and the value functions between a plurality of numerical controllers 1 as described above, communication may be performed via a management apparatus or the like (not shown), the numerical controllers 1 may directly communicate with each other, or a cloud may be used. However, for handling large amounts of data, a communication unit with a faster communication speed is preferably provided.

The embodiment of the present invention is described above. However, the present invention is not limited only to the example of the above embodiment and may be carried out in various aspects with appropriate modifications.

For example, the relationships between the respective function units provided in the numerical controller 1 described in the above embodiment are not limited to those shown in the function block diagram of FIG. 6. That is, functions may be divided in any unit or any hierarchical relationship may be established between the functions so long as configurations equivalent to the functions of the respective function units are provided.

The invention claimed is:

1. A numerical controller controlling a machine including at least one axis, the numerical controller comprising:
a machine learning device that performs machine learning of an adjustment of an setting value used in override control of a motor that drives the axis, wherein
the machine learning includes a processor configured to:
acquire state data indicating states of the numerical controller and the machine and containing a current value of the setting value used in override control of the motor;
set reward conditions;
calculate a reward, based on the state data and the reward conditions;
perform the machine learning of the adjustment of the setting value used in override control; and
determine and outputs the adjustment of the setting value used in override control, based on the state data and a machine learning result of the adjustment of the setting value used in override control, and
perform the machine learning of the adjustment of the setting value used in override control, based on the adjusted setting value, the state data acquired after the adjustment of the setting value, and the reward.

2. The numerical controller according to claim 1, wherein the processor is further configured to calculate the reward, based on at least any of cycle time of an action of the machine, a load on a spindle of the machine, breakage of a tool attached to the machine, and machining accuracy of a workpiece machined by the machine.

3. The numerical controller according to claim 1, which is connected to at least another numerical controller and which mutually exchanges or shares the machine learning result with this other numerical controller.

4. A machine learning device performing machine learning of an adjustment of setting value used in override control of a motor that drives at least one axis provided in a machine controlled by a numerical controller, the machine learning device comprising:
a processor configured to:
store a machine learning result of the adjustment of the setting value used in override control;
acquire state data indicating states of the numerical controller and the machine and containing a current value of a setting value used in override control of the motor;
set reward conditions;
calculate a reward, based on the state data and the reward conditions;
perform the machine learning of the adjustment of the setting value used in override control; and
determine and outputs the adjustment of the setting value used in override control, based on the state data and a machine learning result of the adjustment of the setting value used in override control, and
wherein the processor performs the machine learning of the adjustment of the setting value used in override control, based on the adjusted setting value, the state data acquired after the adjustment of the setting value, and the reward.

* * * * *